United States Patent [19]

Tersi et al.

[11] Patent Number: 5,484,539

[45] Date of Patent: Jan. 16, 1996

[54] PROCESS FOR FILTERING POLYMER MELTS WITH DEAD SPOT REDUCTION

[75] Inventors: Paul Tersi, Altenstadt; Wolfgang Briegel, Hanau; Dieter Cermak, Friedrichsdorf; Michael Schulze, Offenbach am Main, all of Germany

[73] Assignee: Zimmer Aktiengesellschaft, Germany

[21] Appl. No.: 413,686

[22] Filed: Mar. 30, 1995

Related U.S. Application Data

[62] Division of Ser. No. 252,753, Jun. 2, 1994.

[30] Foreign Application Priority Data

Nov. 8, 1993 [DE] Germany .................... 43 38 129.4

[51] Int. Cl.⁶ ........................................... B01D 35/18
[52] U.S. Cl. ................... 210/774; 210/790; 210/184; 210/323.2; 210/433.1; 210/434; 210/456; 210/500.25; 425/197
[58] Field of Search ................................ 210/774, 790, 210/323.2, 433.1, 434, 456, 500.25; 425/197, 198, 199; 264/169

[56] References Cited

U.S. PATENT DOCUMENTS

| | | | |
|---|---|---|---|
| 3,767,056 | 10/1973 | Neuman | 210/434 |
| 3,847,524 | 11/1974 | Mott | 425/199 |
| 4,358,375 | 11/1982 | Wood | 425/199 |
| 4,488,965 | 12/1984 | Muller et al. | 210/532.2 |
| 4,849,103 | 7/1989 | Schmidt et al. | 425/199 |
| 4,921,607 | 5/1990 | Langley | 425/199 |

FOREIGN PATENT DOCUMENTS

| | | |
|---|---|---|
| 255479 | 4/1988 | German Dem. Rep. . |
| 3617370 | 5/1986 | Germany . |
| 4125181 | 7/1991 | Germany . |
| 9000434 | 1/1990 | WIPO . |

Primary Examiner—Robert A. Dawson
Assistant Examiner—Robert James Popovics
Attorney, Agent, or Firm—Banner & Allegretti, Ltd.

[57] ABSTRACT

A process for filtering polymer melt which minimizes the generation of dead zones in the filter and provides uniform residence time and accurate temperature control. The process is carried out in an apparatus comprising a plurality of heat exchanger pipes, each enclosing a filter cartridge surrounded by an annular space which terminates at its upper end in a plurality of narrow channels. The molten polymer is charged into the annular space and divided into primary and secondary streams. The primary stream flows through the filter cartridge and the secondary stream, which constitutes 0.03 to 3.0 weight percent of the weight of the combined streams, flows through the narrow channels, whereupon the streams are combined and discharged from the apparatus. The discharge temperature of the polymer is maintained within ±1° C. of the charging temperature and the heat exchanger fluid enters the apparatus at a temperature within 1° and 5°C. of the temperature of the melt.

8 Claims, 1 Drawing Sheet

PROCESS FOR FILTERING POLYMER MELTS WITH DEAD SPOT REDUCTION

The Invention relates to a process for the filtration of polymer melts using filter cartridges and is a division of Ser. No. 08/252,753 filed Jun. 2, 1994, now allowed and pending issue.

BACKGROUND OF THE INVENTION

Increasing requirements on the quality of polymer products, such as fibers, foils, but also pellets from linear polyesters, polycarbonates, polyamides or polyolefines, demand the finest possible filtration of the polymer melts after discharge from the last synthesis reactor or separator, and before the entrance into the spinning unit for further processing.

THE PRIOR ART

Cylindrical filter elements, so-called "filter cartridges" of folded, flexible materials, such as metal wire webbing and non-woven metallic fiber fabric, with a filter fineness—depending on the intended use of the polymer—of 5 to 150 μm currently are used for this filtration. The final drop in pressure of the filter cartridges, depending on the order of magnitude, ranges from 50 to 150 bar. The throughput of large-scale technical apparatuses requires a multiplicity of filter cartridges which are held in a filter plate, and are grouped together into filter packets. The filter packets are inserted in vessels which are pressure-tight, and are thus correspondingly thick-walled. The polymer melt which is to be filtered is pumped into the pressure vessel and, after passing through the porous walls of the filter cartridges, exits again at the filter plate. In order to maintain the melt temperature of over 180° C. to approx. 350° C., depending on the polymer, the pressure vessel is inserted, in a precisely fitting manner, into a second vessel, the walls of which have heat exchanger fluid flowing through them (see: Chemiefasern / Textilindustrie [November 1989], pages 1771–74, as well as Filtration & Separation, Volume 26/1 [January/February 1989], pages 43–45).

The high quality demands on polymer products at the present time, particularly during direct spinning, during the filtration stage, presuppose a uniform residence time of the entire polymer melt, or a uniform through-flow without dead zones, as well as a uniform, constantly even temperature.

In the known polymer melt filtration systems previously described, a uniform throughflow is not guaranteed since the drops in pressure from the filter cartridges, and the distances between the filter cartridges and the adjacent wall are different from one cartridge to the next. In particular, the flow is minimal directly below the filter plate which results in thermal damage to the polymer, even to the point of cracked products. The primary flow can be influenced through the installation of guide surfaces, but not the dead zones, however, which are, instead, increased.

Also, a uniform tempering of the entire melt in the known systems is problematic, since the heat transfer is impeded by the thick walls of the pressure vessel and, in addition, by the small clearance between the pressure vessel and the heating vessel, which is irregular over its circumference. Differing temperatures which, among other points, bring about differences in the viscosity and consequently in the residence time of the polymer, arise between the center of the vessel and the walls of the vessel, as well as along the wall. Increases in temperature, which are produced by pressure differences in the melt, can be compensated for only in an insufficient manner.

It is additionally known to control the temperature of the polymer in the processing unit, independently of the temperature of the last synthesis reactor, by interpositioning an additional heat exchanger, such as a pipe assembly heat exchanger, for example.

SUMMARY OF THE INVENTION

It is thus the object of the invention to modify the known process for polymer melt filtration in such a manner that the disadvantages noted above are obviated, or at least minimized.

The invention provides a process which is economical and ensures a uniform residence time without dead zones, as well as a uniform, targeted tempering of the polymer melt. The apparatus of the invention is designed to facilitate performance of the process.

In a preferred form of the invention, the filter comprises a cylindrical vessel divided by two horizontal plates into a small upper collecting chamber, a large middle chamber and a small lower product-distribution chamber. A plurality of vertical open ended heat exchange pipes are mounted in the middle chamber and extend between the plates. The space between the pipes connects to a source of heat carrier fluid for heating the polymer flowing through the filter pipes. A filter cartridge is disposed concentrically within each pipe and is radially spaced therefrom by a projection on the inner wall of the pipe to form an annular space around each cartridge. Each cartridge is closed at its lower ends and open at its upper end which connects to the upper collecting chamber within the vessel. A plurality of narrow channels are circumferentially spaced around the top end of the cartridge between the top end and the projection on the inner wall of the pipe to provide fluid communication between the annular space and the collecting chamber. A small amount of polymer flowing through these channels minimizes the generation of dead zones inside the annular space. Most of the polymer flows radially from the annular space, through the wall of the cartridge filter and out the open end thereof into the collecting chamber where it joins the polymer discharged from said channels. About 0.03 to 3.0 weight % of the polymer stream flows through the channels.

The individual cartridges are removable from the pipes for changing and cleaning. Thus, it is not necessary to cool down the whole apparatus to remove the entire filter assembly within the cylindrical vessel. Also, it is preferred that the channels are oriented radially toward the periphery of the pipes and are equipped with a filter medium.

The temperature at which the polymer is discharged is different from or substantially equal to the temperature at which the polymer enters the filter. By eliminating the dead zones and by providing a uniform, targeted tempering, the residence time of the polymer within the filter is uniform.

THE DRAWING

The invention will be illustrated in greater detail with reference to the sole FIGURE which schematically depicts a longitudinal section through one half of a preferred form of implementation of the filtration apparatus which is used in the process in accordance with the invention. To make visible the inventive details, instead of the multitude of filter cartridges actually present in the filter, only two filter cartridges with greatly enlarged diameter (compared with the other dimensions) are shown.

DETAILED DESCRIPTION

Figure 1:
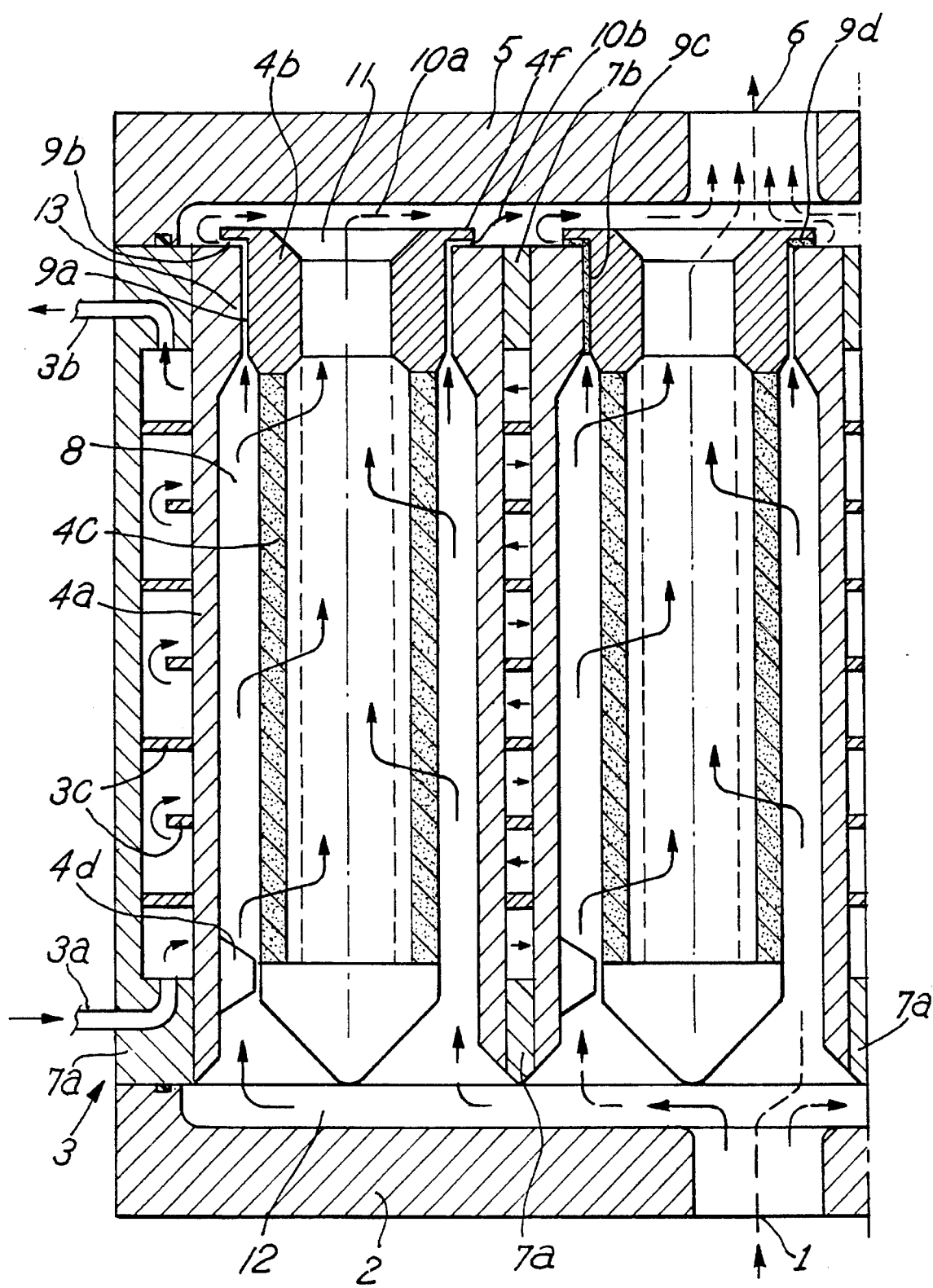

The polymer filtration apparatus used to practice the process of the invention comprises essentially a closed upright cylindrical vessel 3 divided into three separated compartments or chambers by two horizontal partitioning walls, usually called pipe plates 7a, 7b. The middle compartment is much larger than the two other chambers 11, 12 and contains a plurality of vertical open-ended pipes 4a, the opposed ends of which are inserted in and held by borings in the pipe plates 7a, 7b. Horizontal sequential disk baffles 3c also serve to position the pipes within the cylindrical vessel 3. A heat carrying fluid enters the middle chamber through the tube 3a near lower pipe plate 7a and surrounds all the pipes 4a. The flow is oriented by the baffles 3c and exits through tube 3b close to the upper pipe plate 7b.

The polymer melt is pumped from below through a central opening 1 in the lower cover 2 of the vessel into the lower product-distribution chamber 12 and then into the pipes 4a which are circumcirculated by heat carrying fluid. The lower chamber 12 between the lower vessel cover or bottom 2 and the lower pipe plate 7a should be formed in such a manner to ensure uniform distribution of the melt to all pipes in the vessel.

In divergence from conventional pipe assembly heat exchangers, a filter cartridge 4c with a ring connection 4b on the upper end is inserted concentrically into every pipe 4a with the formation of an external annular space or aperture 8. The upper end of pipe 4a has a projection 13 which serves to space the cartridge from the inner wall of the pipe. Filter cartridges of the commercially conventional type, such as those made from folded metal wire lattice with an insert of folded non-woven metallic fiber fabric, for example, can be used. The filter cartridges 4c should extend close to the lower end of the heat exchanger pipes 4a in the range of from 95 to 100% of the length of the pipe. The lower ends of the cartridges are closed. The external diameter of the filter cartridges 4c is constant over its entire length, so that the annular aperture 8 has a constant width between the filter cartridge 4c and the surrounding pipe 4a. The width of the space 8 is dimensioned in a manner to minimize the loss of pressure which is caused by the annular aperture in relation to that which is caused by the filter medium 4c. Depending on the diameter of the filter cartridges, the width of the aperture is from 5 to 20 mm.

Filter cartridges 4c having diameters which reduce slightly in the downward direction may be used. In this case, the width of the space 8 correspondingly increases in the downward direction. By providing an annular space of defined width, constant flow conditions which are equal for all filter cartridges are achieved.

The upper ends of the filter cartridges 4c connect to an externally threaded connecting fitting 4b which screws into internal threads on the projection 13 of pipe 4a. Instead of a screw thread, the connection between the fitting 4b of the filter cartridges 4c and the heat exchanger pipes 4a can also be carried out in other ways, for example, in a bayonet-like manner. But since the filter cartridges 4c must be removed frequently for cleaning, they must be easily detachable. Preferably, the connection ring fittings 4b are of larger diameter in the upper edge area to provide a flange 4f extending over the ends of the heat exchanger pipes 4a. The fittings are provided with an annular washer between flange 4f and the upper side of pipe plate 7b or the upper ends of the pipes 4a as explained below. Centering supports 4d, such as three pins or clamps symmetrically arranged, can additionally be provided in the lower pipe area.

At the level of the connecting ring fittings 4b several narrow connection channels 9a, connecting the annular space 8 and the upper collecting chamber 11, are disposed in circumferentially-spaced relation between each pipe projection 13 and the ring fitting 4b inserted therein. These channels are preferably constructed as grooves or borings in the ring fittings 4b, but can also be positioned entirely or partially within the wall of projection 13 on the pipe 4a. Preferably, the channels 9a in the area of the flange 4f turn laterally in a direction parallel to the pipe plate 7b as indicated at 9b. The channels 9a, 9b may contain a filter medium, preferably a non-woven metallic fiber fabric or a porous metal. The annular washer mentioned above is preferably constructed as a porous filter 9d; the filter medium can also fill the entire channel 9c, in particular when the washer consists of a non-porous seal with passages for channels 9b.

Most of the melt entering the inlet 1 flows through the wall of cartridge 4c as indicated by the arrows, and exits in the axial area of the cartridges as a primary stream at 10a. A minor proportion, comprising a secondary stream 10b, flows directly through annular spaces into channels 9a, 9b and exits in the peripheral area of the cartridges.

The cross-section of these channels 9a, 9b is dimensioned in such a manner that the flow therethrough constitutes approximately 0.03 to 3.0 weight %, preferably 0.1 to 1.0 weight % of the entire stream. The quantity of secondary stream 10b is so small that filtering of this portion of polymer melt is not absolutely necessary. Preferably, however, filtering is provided by filter medium 9c, 9d in the channels.

The primary and secondary streams 10a, 10b exiting from the heat exchanger pipes 4a are united in a collecting chamber 11 beneath the upper cover 5 of the vessel 3. The filtered polymer melt is finally discharged through a central discharge opening 6 from the collecting chamber.

The collecting chamber 11 may include deflecting plates, not shown, which deflect the streams 10a, 10b exiting from the pipes before reaching the discharge opening 6 in the direction of the periphery of the collecting chamber 11. This measure leads to a more uniform through-flow of all spaces in the collecting chamber.

The secondary melt streams 10b impede the occurrence of dead zones with stagnating polymer melt. Thus, polymer melt flows continuously through the upper annular aperture area and within the collecting chamber 11 at the circumference of the connecting fittings 4b.

In order to prevent low-current flow zones in the collecting chamber 11 in the area between the pipes 4a, the pipes are positioned in the densest packing geometrically possible, but spaced sufficiently for the circumcirculation of heat carrier fluid. This arrangement makes possible a rinsing of the spaces between the pipes by means of the secondary melt streams 10b.

The temperature of the polymer melt which is to be filtered lies, in general, 10° to 50° C. above the melt temperature of the polymer and thus, depending on the polymer, at approximately 180° C. to over 330° C.

The tempering of the apparatus parts in contact with the melt is carried out by means of one or several heat carrier liquid circuits, and for example, by electrically heating the upper and lower covers 5 and 2 of the vessel 3.

The heat exchanger pipes 4a with the filter cartridges 4c installed, which are essential to the process, are in direct contact with the heat carrier fluid, which enters at 3a and exits at 3b. For improved heat transfer performance the segmental disk baffles 3c cause the heat carrier fluid to flow mainly perpendicular to the pipes 4a. In comparison with the diameter of the pressure vessel used in the prior art filtration, the diameter of the heat exchanger pipes is very small. As a result, the use of thin-walled pipes with excellent heat transfer is possible. In order to exclude areas of increased melt viscosity with the consequence of low flow speed resulting in local polymer deposits on the wall 4a, the flow speed of the heat carrier fluid must be set high enough that the inlet and outlet temperatures of the heat carrier fluid are nearly equal (±1° C.).

Depending on the process stages which are placed before or after the filtration stage, the exit temperature of the polymer melt may equal the inlet temperature of the melt, or may diverge either upwardly or downwardly from the inlet temperature. For identical inlet and outlet temperatures of the polymer, i.e., within measuring precision, ±1° C., the difference between the temperature of the polymer melt and the entrance temperature of the heat carrier fluid should be as small as possible within the range of 1° to 5° C.

If the exit temperature of the polymer melt differs from the inlet temperature normally by 2° to 10° C. then a higher temperature difference between the entrance temperatures of the polymer melt and the heat carrier fluid, in the range of 5° to 20° C. is necessary. In this case, the filtration device which is used in accordance with the invention is particularly advantageous since, in the process of the invention—in a manner different from the known processes, which require both a complete heat exchanger as well as also a complete filtration apparatus—a single device, which unites the function of both apparatuses in itself, is sufficient.

The process in accordance with the invention is suited for the filtration of any polymer melts, on the presupposition that the flow speed of the polymer melts between the inlet into and the outlet from the filtration device is high enough to rule out thermal damage of the polymer. Polyamides, polycarbonates, polyolefines and linear polyesters, particularly ethyleneterephthalate-homo- and -copolymers, may be treated successfully. The filtration of the polymer melts is preferably carried out after the exit from the last synthesis reactor or separator, and before the entrance into the final processing unit. The use in an earlier process stage is possible, but provides no economic advantage. The invention is preferably used in polymer synthesis processes with a directly-connected fiber spinning unit.

The process in accordance with the invention makes possible the filtration of polymer melts while ensuring a uniform residence time, as well as a very uniform temperature of all the polymer melt during the entire filtration process, both of which are indispensable for meeting the present-day quality requirements. This is attained by guiding the polymer melts into pipes, which concentrically encircle the filter cartridges at a defined annular space, by means of targeted secondary polymer streams for the rinsing of dead zones and through improved heat transfer through the integration of the filtration device into a pipe assembly heat exchanger.

By means of the homogenous through-flow and the very uniform tempering, both the thermal damage of the polymer, as well as the polymer deposits in the filter casing and within the filter cartridges, are reduced. By that means, the running time between two cleaning cycles is extended by at least 50%. In addition, the cleaning of the filter cartridges is distinctly simplified since, after the removal of the upper cover, every filter cartridge can be individually removed and replaced with a clean one, without the entire filtration system having to be cooled off. In the prior art process which is described above, the entire system must be first cooled off, then the very heavy filter plate with all the filter cartridges be lifted off and, after the changing of the cartridges, installed again, and the entire system heated up again.

The invention further provides a targeted adjustment of the exit temperature of the polymer melts to a higher or lower value than the inlet temperature, without the use of an additional heat exchanger.

We claim:

1. A process for polymer melt filtration comprising
   providing a filtration apparatus comprising a plurality of vertically-disposed, closely-spaced heat exchanger pipes surrounded by a heat carrier fluid, each pipe enclosing a filter cartridge radially spaced therefrom to form an annular space around each cartridge, said annular space terminating at its upper end in a plurality of narrow channels,
   charging molten polymer upwardly into said annular space,
   dividing said molten polymer in each pipe into a primary stream and a secondary stream,
   passing said primary stream laterally through said cartridge and out the upper end of said cartridge,
   passing said secondary stream upwardly through said narrow channels,
   combining said primary and secondary streams flowing from said plurality of pipes, and
   discharging said combined streams from the upper end of said filtration apparatus,
   said secondary stream constituting between 0.03 and 3.0 wt. % of
   the total weight of the combined streams.

2. The process of claim 1 in which said secondary streams are oriented radially towards the periphery of the pipes directly before combining said primary and secondary streams.

3. The process of claim 1 in which said secondary streams are passed through a filter medium before combining said primary and secondary streams.

4. The process of claim 1 in which said secondary streams are deflected radially outward with respect to said pipes and then directed towards the central discharge.

5. The process of claim 1 in which said second stream constitutes between 0.1 to 1.0 wt. % of the total weight of the combined streams.

6. The process of claim 1 in which the molten polymer is maintained at a discharge temperature within ±1° C. of the charging temperature, whereby the charging temperature of said heat carrier fluid differs from the temperature of said melt by between 1° and 5° C.

7. The process of claim 1 in which the discharge temperature of the polymer melt differs from the charging temperature by 2° to 10° C., whereby the charging temperatures of said melt and of said heat carrier fluid differ by between 5° and 20° C.

8. The process of claim 1 in which said polymer is an ethylene-terephthalate homo- and copolymer.

* * * * *